J. M. BURKE.
Cultivator.
No. 45,019. Patented Nov 15, 1864.
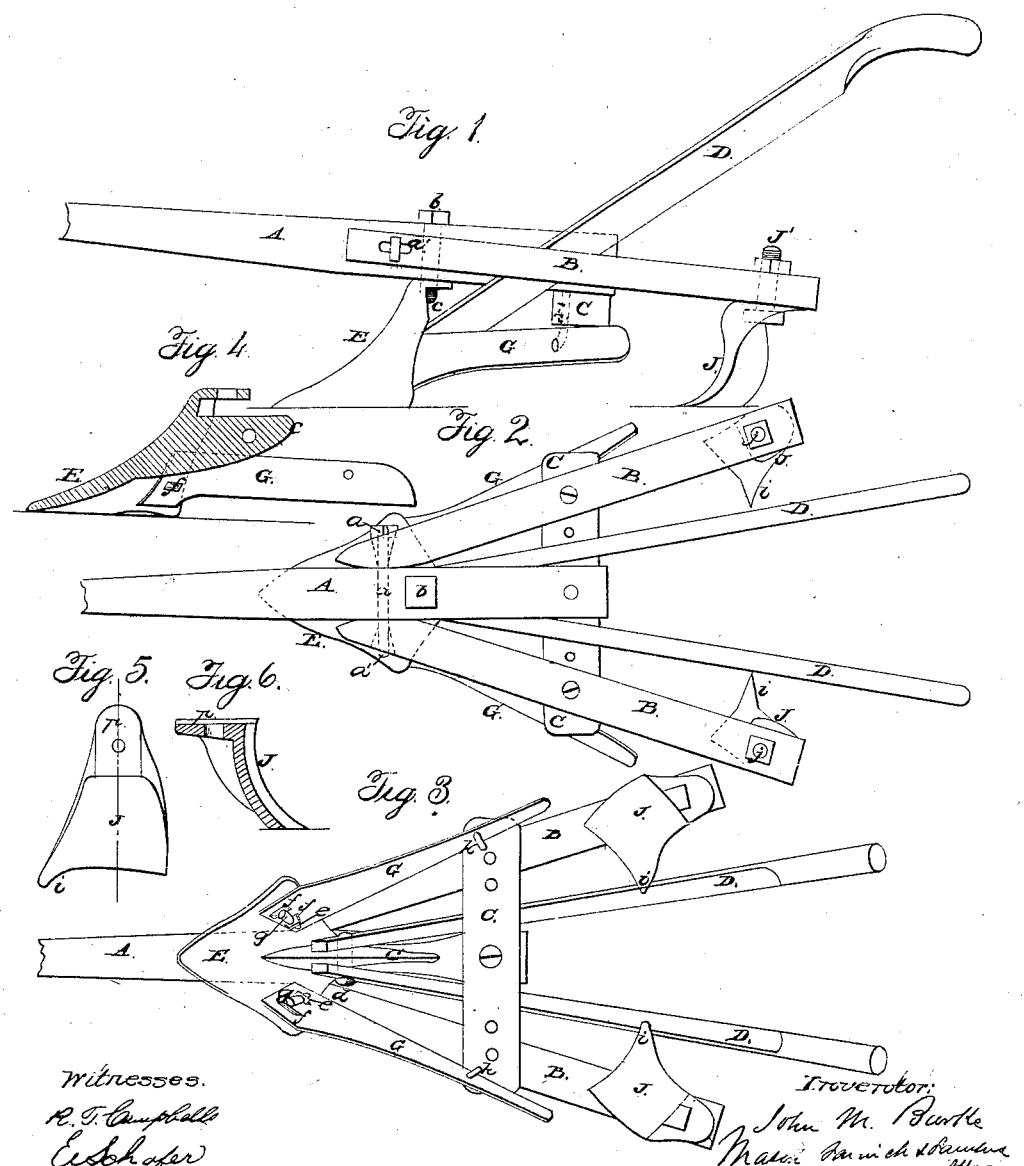

UNITED STATES PATENT OFFICE.

JOHN M. BURKE, OF DANSVILLE, NEW YORK.

IMPROVEMENT IN CULTIVATORS.

Specification forming part of Letters Patent No. 45,019, dated November 15, 1864.

*To all whom it may concern:*

Be it known that I, JOHN M. BURKE, of Dansville, county of Livingston, and State of New York, have invented a new and Improved Farm Implement; and I do hereby declare that the following is a full, clear, and exact description thereof, reference being had to the accompanying drawings, making a part of this specification, in which—

Figure 1 is a side elevation of my improved implement complete. Fig. 2 is a top view of Fig. 1. Fig. 3 is a bottom view of Fig. 1. Fig. 4 is a vertical longitudinal section of the front shovel. Figs. 5 and 6 show the form of the cultivator-teeth which I employ.

Similar letters of reference indicate corresponding parts in the several figures.

The object of my invention is to so construct a farm implement that it can be readily converted into a cultivator for young crops, an eradicator of weeds, a double mold-board plow, or a cleaner for water-courses; and while the implement thus combines all the advantages of many implements, my object is to so construct it that it will be simple and can be cheaply made or repaired by any ordinary workman, all as will be hereinafter described.

To enable others skilled in the art to make and use my invention, I will describe its construction and operation.

In the accompanying drawings, A represents the main beam, to the forward end of which the team can be attached by means of a clevis or other suitable device.

B B are two side beams, which are secured at their forward ends to the sides of the main beam by means of a transverse bolt, $a$, having a T-head, $a'$, on one end and a nut screwed on the opposite end. This bolt passes through the ends of the two side beams and also through the intermediate beam, as shown clearly in Fig. 2, and the holes through the side beams are made so as to admit of the adjustment of the rear ends of these beams either from or toward each other. Those portions of the beams B which bear on the sides of the central beam are rounded, as shown in Fig. 2, to facilitate said adjustment and to accommodate themselves to the positions in which they may be set.

The transverse beam C, which is secured to the under side of the beam A, near its rear end, projects out equal distances on each side thereof and serves as a brace, and also as a support for the rear part of the two side beams, B B. These side beams are secured at the proper distances from the central beam by means of bolts which pass through the transverse beam C; and there are a number of extra holes made through this latter beam to receive said bolts when it is desired to contract or expand the rear ends of the side beams.

The plow-handles D D are secured to the central beam, A, at a point in rear of the forward connection of the side beams, and the lower ends of these handles are again secured to a pin which is formed on the rear part of the front shovel, as will be hereinafter described.

The shovel E is formed somewhat like a double mold-board plow with a smooth rounding surface and flaring wings terminating in a contracted upper end, which has a lip formed on it to receive the vertical screw-bolt $b$, that secures the shovel to the beam A. This shovel is again secured to the beam A and further strengthened by forming a fin, $c$, on its rear surface, as shown in Figs. 3 and 4, and securing the lower contracted ends of the plow-handles D to it by means of a transverse bolt, $d$. In this manner the shovel, the plow-beam, and the handles are all secured together and firmly braced, so that they mutually strengthen each other.

On the inside surfaces of the wings of the shovel E staples $e\ e$ are formed or suitably secured, the object of which is to form a forward attachment for two narrow wings or removable mold-boards, G G, which have slots $f$ through their front ends, any one of which will receive the staples, and by means of wooden pins $g\ g$ the plates G are secured in place, as clearly shown in Fig. 4. Several slots are made in each plate G for the purpose of enabling me to set their forward ends at different heights from the sole of the shovel. The rear ends of these mold-boards G flare outward, and are secured to the under side of transverse beam C by means of short rods $h\ h$. This beam C is thus made to perform the office of a support for the plates G, both vertically and laterally.

The adjustable side beams, B B, each carry one or more cultivator-teeth, J. Only one is represented on each beam in the drawings. These teeth are formed with hooks $i$ on their inner cutting-points, terminating in oblique cutting-edges—*i. e.*, the cutting-edges of these teeth are arranged obliquely to the central beam, A, and the cutting-hooks *i i* work up closely to the rows of plants and easily sever the roots of the weeds. The body of each tooth is a thin blade, tapering in width upward, and bent so as to present a concave surface to the earth and weeds. As it is found necessary to adjust these teeth very often, I employ only one screw-bolt, *j*, to each tooth to connect it to its respective beam B, and by simply loosening the nut on this bolt the tooth can be set at any desired angle and then rigidly secured again to its beam. In order to make a single bolt answer for each one of the teeth, I curve out the upper surface of the shank of each tooth, as shown at *p*, Figs. 5 and 6, leaving sharp edges, which bite firmly into the wood of the beams when the nuts on the bolts are screwed tightly, and thus prevent the teeth from twisting out of place.

From this description of my farm implement it will be seen that I secure lightness and great strength, and the advantages of having the three farm implements known as the "cultivator," "horse-hoe," and the "ridging-plow" combined in a single machine in such manner that by a very simple change all the advantages of either one of these implements are secured. When used as a cultivator the long mold-boards G G may be removed. When used for cleaning out water-courses, for making deep or shallow or wide or narrow furrow, or for hilling or ridging, the side beams may be left off, and wide or narrow front shovels may be used, according to the kind of work to be done. The long mold-boards G G can be adjusted up or down and their rear ends contracted or expanded at pleasure, thereby enabling the farmer to make a high or sharp or a broad and flat hill or ridge, as he may desire.

Having thus described my invention, what I claim as new, and desire to secure by Letters Patent, is—

1. The shovel E, having a narrow central fin, *c*, and staples *e e*, formed on its inner or under surface in the manner described, and for the purpose set forth.

2. The teeth J, with cutting-hooks *i* and concave ends *p*, in the manner and for the purpose described.

3. The arrangement of the shovel E *c f*, wings G G, side beams, B B, handles D D, cross-beam C, main beam A, and teeth J *i p*, the whole constituting an improved cultivator, substantially as and for the purpose set forth.

JOHN M. BURKE.

Witnesses:
C. P. JONES,
M. L. DAVIS.